(12) United States Patent
Park et al.

(10) Patent No.: US 12,288,316 B2
(45) Date of Patent: Apr. 29, 2025

(54) METHOD FOR PROVIDING HDR IMAGE AND ELECTRONIC DEVICE SUPPORTING THE SAME

(71) Applicant: Samsung Electronics Co., Ltd., Gyeonggi-do (KR)

(72) Inventors: Chansik Park, Gyeonggi-do (KR); Dongwoo Kim, Gyeonggi-do (KR); Jeehong Kim, Gyeonggi-do (KR); Wonjun Roh, Gyeonggi-do (KR); Hyuntaek Lee, Gyeonggi-do (KR); Donghyun Yeom, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 388 days.

(21) Appl. No.: 17/672,110

(22) Filed: Feb. 15, 2022

(65) Prior Publication Data

US 2022/0301125 A1    Sep. 22, 2022

Related U.S. Application Data

(63) Continuation of application No. PCT/KR2022/000184, filed on Jan. 5, 2022.

(30) Foreign Application Priority Data

Mar. 22, 2021   (KR) ........................ 10-2021-0036512

(51) Int. Cl.
  *G06T 5/92*    (2024.01)
(52) U.S. Cl.
  CPC ...... *G06T 5/92* (2024.01); *G06T 2207/20208* (2013.01)

(58) Field of Classification Search
  None
  See application file for complete search history.

(56) References Cited

U.S. PATENT DOCUMENTS

| 10,963,998 | B1 * | 3/2021 | Baar ........................ G09G 5/10 |
| 2003/0001856 | A1 | 1/2003 | Sawada et al. |

(Continued)

FOREIGN PATENT DOCUMENTS

| JP | 2017-045030 | 3/2017 |
| JP | 2019-502221 | 1/2019 |

(Continued)

OTHER PUBLICATIONS

European Search Report dated Jan. 10, 2023 issued in counterpart application No. 22704490.6-1210, 9 pages.

(Continued)

*Primary Examiner* — Rinna Yi
(74) *Attorney, Agent, or Firm* — The Farrell Law Firm, P.C.

(57) ABSTRACT

A method and electronic device are provided for providing a high dynamic range (HDR) image. The HDR image is obtained. A first area, in which the HDR image is displayed, and a second area, in which an image is displayed, are identified within a screen. The first area is white point-processed based on a first white point, and the second are is white point-processed based on a second white point that is set for a display of the electronic device and different from the first white point. The screen including the white point-processed first area and the white point-processed second area is displayed on the display.

10 Claims, 11 Drawing Sheets

(56) References Cited

U.S. PATENT DOCUMENTS

| | | |
|---|---|---|
| 2012/0262600 A1 | 10/2012 | Velarde et al. |
| 2015/0245004 A1 | 8/2015 | Guo et al. |
| 2015/0245043 A1 | 8/2015 | Greenebaum et al. |
| 2015/0326841 A1 | 11/2015 | Cho et al. |
| 2016/0269706 A1 | 9/2016 | Li et al. |
| 2016/0358346 A1 | 12/2016 | Hendry et al. |
| 2017/0311034 A1 | 10/2017 | Nishi et al. |
| 2018/0247607 A1 | 8/2018 | Cho |
| 2018/0278963 A1 | 9/2018 | Schueuer et al. |
| 2018/0336846 A1 | 11/2018 | Lee et al. |
| 2019/0052908 A1 | 2/2019 | Mertens et al. |
| 2019/0243418 A1 | 8/2019 | Hunter et al. |
| 2020/0137362 A1* | 4/2020 | Damberg ............ H04N 9/3185 |
| 2020/0193572 A1 | 6/2020 | Zhou et al. |
| 2022/0237913 A1* | 7/2022 | Wyble ............... G02B 27/0101 |

FOREIGN PATENT DOCUMENTS

| | | |
|---|---|---|
| JP | 6741975 | 8/2020 |
| KR | 1020150128168 | 11/2015 |
| KR | 1020170141238 | 12/2017 |
| KR | 1020180063226 | 6/2018 |

OTHER PUBLICATIONS

International Search Report dated Apr. 19, 2022 issued in counterpart application No. PCT/KR2022/000184, 12 pages.
Korean Office Action dated Oct. 2, 2024 issued in counterpart application No. 10-2021-0036512, 17 pages.
European Search Report dated May 27, 2024 issued in counterpart application No. 22704490.6-1207, 16 pages.

* cited by examiner

METHOD FOR PROVIDING HDR IMAGE AND ELECTRONIC DEVICE SUPPORTING THE SAME

CROSS-REFERENCE TO RELATED APPLICATION(S)

This application is a bypass continuation application, claiming priority under § 365(c), to International Application No. PCT/KR2022/000184, filed on Jan. 5, 2022, which is based on and claims priority to Korean Patent Application Serial No. 10-2021-0036512, filed on Mar. 22, 2021 in the Korean Intellectual Property Office, the disclosures of each of which are incorporated herein by reference in their entirety.

BACKGROUND

1. Field

The disclosure relates generally to an electronic device with a display, and more particularly to methods for providing high dynamic range (HDR) images and electronic devices supporting the same.

2. Description of Related Art

Electronic devices have been developed that are capable of generating HDR-applied images (hereinafter referred to as "HDR images") and displaying the generated HDR images. HDR is a technology for displaying images with more finely divided contrast, which makes them similar to those naturally recognized by the eyes of a user.

HDR may be divided into HDR10, which uniformly applies tone mapping of an image to an entire sequence of the image using static metadata, and HDR10+ or Dolby vision, which differently applies tone mapping of an image according to each frame of the image using dynamic metadata.

HDR10 using static metadata and HDR10+ and Dolby vision using dynamic metadata both use, as a white point, $D_{65}$ as defined by the international commission on illumination (CIE). For example, an HDR image is mastered based on $D_{65}$ and played based on $D_{65}$.

$D_{65}$ may be a white point of a standard light source representing the state of natural daylight having a correlated color temperature (CCT) of about 6500 Kelvin (K). In the ultraviolet (UV) coordinate system, $D_{65}$ may be expressed as 6504K+8 minimum perceptible color difference (MPCD).

An electronic device displays the HDR image by white point-processing the screen including the HDR image based on $D_{65}$. For a screen including a non-HDR image (e.g., a standard dynamic range (SDR) image), the electronic device displays the non-HDR image by white point-processing the screen based on a white point set for the display upon manufacture of the display (or a white point set by the user). For example, upon playing the HDR image and the SDR image, the electronic device displays a screen including the SDR image and the HDR image white point-processed based on $D_{65}$ and, upon playing only the SDR image, the electronic device displays a screen including the SDR image white point-processed based on the white point set for the display upon manufacture of the display. In a case where the display of the HDR image is terminated while the HDR image and the SDR image both are displayed, so that the electronic device displays the screen including the SDR image alone, an irregularity may occur at the screen due to a sharp change of the white point for the screen from $D_{65}$ to the white point set for the display upon manufacture of the display.

SUMMARY

Embodiments relate to a method for providing an HDR image and an electronic device supporting the same, which may prevent an irregularity at the screen by white point-processing HDR images and non-HDR images based on different white points.

Objects of the present invention are not limited to the foregoing, and other objects would be apparent to one of ordinary skill in the art from the following description.

According to an aspect of the disclosure, an electronic device is provided that includes a display and at least one processor functionally connected with the display. The at least one processor is configured to obtain an HDR image, and identify, within a screen, a first area, in which the HDR image is displayed, and a second area, in which an image is displayed. The at least one processor is also configured to white point-process the first area based on a first white point and white point-process the second area based on a second white point that is set for the display and different from the first white point. The at least one processor is further configured to display, on the display, a screen including the white point-processed first area and the white point-processed second area.

According to an aspect of the disclosure, a method is provided for providing an HDR image by an electronic device. The HDR image is obtained. A first area, in which the HDR image is displayed, and a second area, in which an image is displayed, are identified within a screen. The first area is white point-processed based on a first white point, and the second are is white point-processed based on a second white point that is set for a display of the electronic device and different from the first white point. The screen including the white point-processed first area and the white point-processed second area is displayed on the display.

According to an aspect of the disclosure, an electronic device is provided that includes a display and at least one processor functionally connected with the display. The at least one processor is configured to obtain an HDR image, white point-process the HDR image based on a first white point of a designated light source, white point-process an image based on a second white point set for the display, blend the white point-processed HDR image and the white point-processed image, and display, through the display, the blended HDR image and image.

A method for providing an HDR image and an electronic device for supporting the same may prevent irregularities for the screen by white point-processing HDR images and non-HDR images based on different white points.

A method for providing an HDR image and an electronic device for supporting the same may minimize irregularities for the screen displayed before/after termination of the display of the HDR image by white point-processing the first area, based on the second white point.

A method for providing an HDR image and an electronic device for supporting the same may minimize irregularities for a screen displayed before/after the display of an HDR image is terminated by white point-processing an image based on a first white point and white point-processing an object based on a second white point in a case where the HDR image includes the image and the object (e.g., an object including text or a graphic obtained through editing while or after obtaining the image).

A method for providing an HDR image and an electronic device for supporting the same may gradually white point-process the first area, in which the HDR image used to be displayed, from the first white point to the second white point after the display of the HDR image is terminated, thereby minimizing irregularities for the screen displayed before/after the termination of the play of the HDR image, which used to be displayed through the first area white point-processed based on the first white point.

A method for providing an HDR image and an electronic device for supporting the same may perform a white point-processing operation on the screen based on the white point of the display of the external electronic device, thereby minimizing irregularities for the screen displayed before/after the display of the HDR image on the external electronic device is terminated, in a case where the electronic device shares the screen with the external electronic device.

BRIEF DESCRIPTION OF THE DRAWINGS

The above and other aspects, features, and advantages of certain embodiments of the disclosure will be more apparent from the following description taken in conjunctions with the accompanying drawings, in which.

DETAILED DESCRIPTION

Figure 1:
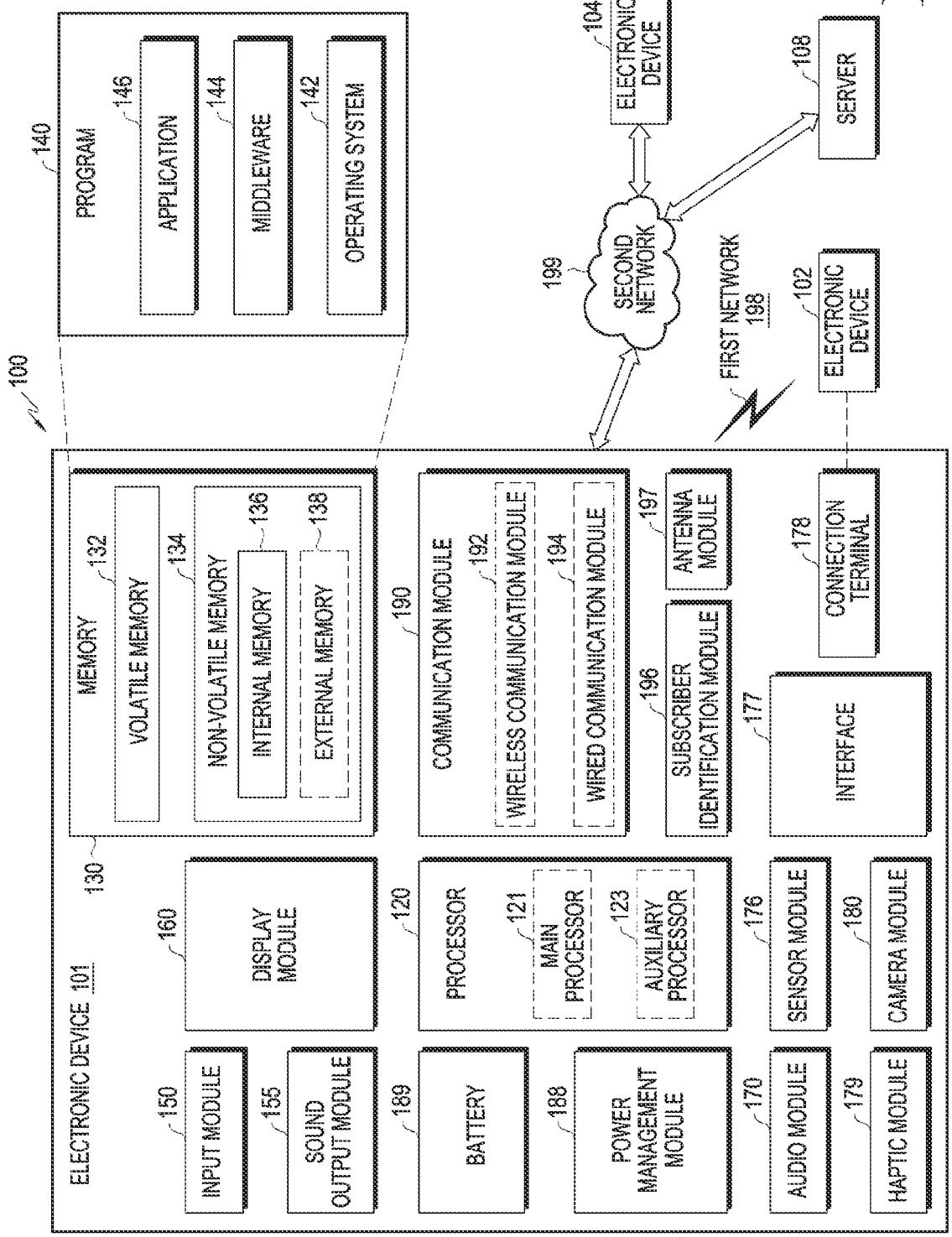
FIG. 1 is a block diagram illustrating an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device 101). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device 101 via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 101 (102 or 104) each may be a device of the same or a different type from the electronic device 101. According to an embodiment, all or some of operations to be executed at the electronic device 101 may be executed at one or more of the external electronic devices 101 (102, 104, or 108). For example, if the electronic device 101 should perform a function or a service automatically, or in response to a request from a user or another device, the electronic device 101, instead of, or in addition to, executing the function or the service, may request the one or more external electronic devices 101 to perform at least part of the function or the service. The one or more external electronic devices 101 receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device 101 according to various embodiments of the disclosure may be one of various types of electronic devices. The electronic devices 101 may include, for example, a portable communication device (e.g., a smart phone), a computer device, a portable multimedia device, a portable medical device, a camera, a wearable device, or a home appliance. According to an embodiment of the disclosure, the electronic devices 101 are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
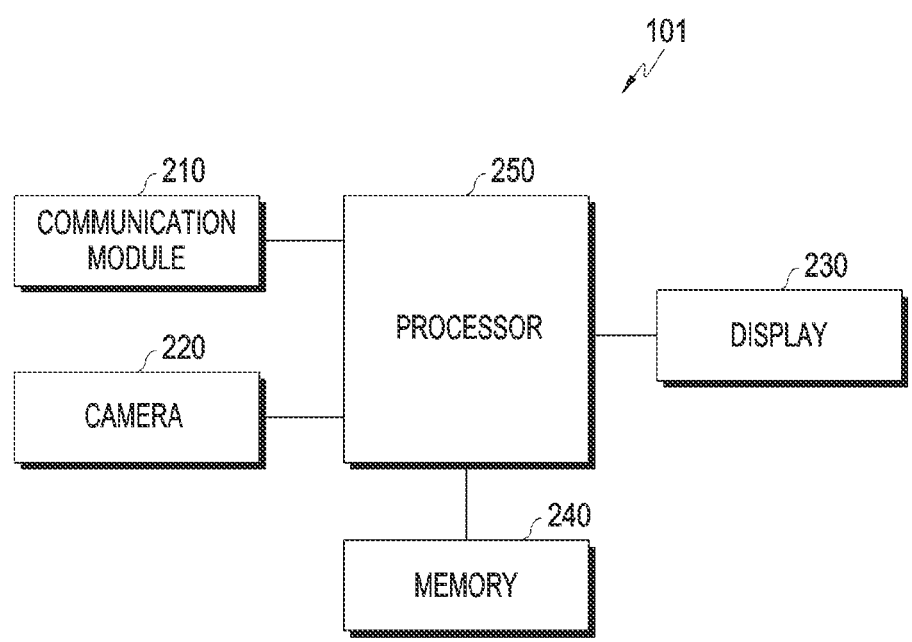
FIG. 2 is a block diagram illustrating an electronic device, according to an embodiment.

FIG. 2 is a block diagram illustrating an electronic device, according to an embodiment.

Referring to FIG. 2, an electronic device 101 includes a communication module 210, a camera 220, a display 230, a memory 240, and/or a processor 250.

The communication module 210 may be included in the communication module 190 of FIG. 1.

The communication module 210 may communicatively connect the electronic device 101 to an external electronic device (e.g., the electronic device 102, the electronic device 104, or the server 108). The communication module 210 may receive an HDR image from the external electronic device. For example, the communication module 210 may receive the HDR image from the external electronic device using a download scheme or a real-time streaming scheme. The communication module 210 may also receive various images (e.g., SDR images) other than the HDR image from the external electronic device.

The camera 220 may be included in the camera module 180 of FIG. 1.

The camera 220 may obtain an HDR image. However, the camera 220 may also obtain various images (e.g., SDR images) other than the HDR image.

The display 230 may be included in the display module 160 of FIG. 1.

A white point may be set for the display 230. A white point, which is a reference for white point-processing the screen to be displayed through the display 230, may be set upon manufacture of the display 230. Hereinafter, the white point set as default for the display 230 is referred to as a "default white point of the display" or a "default white point". A white point may be set based on a user input. For example, the default white point of the display may be changed based on a user input. If the white point of the display 230 is set to a default white point with a correlated color temperature (interchangeably used with "color temperature") of 7000K, then the white point of the display 230 may be changed and set from the default white point with a color temperature of 7000K to a white point with a color temperature of 7500K based on a user input for changing the color temperature from 7000K to 7500K. Hereinafter, for the display 230, the white point set based on a user input is referred to as a "user set white point". The default white point and/or user set white point of the display may be stored in the memory 240.

The memory 240 may be included in the memory 130 of FIG. 1.

The memory 240 may store various information for performing an operation for providing an HDR image. The information for performing the operation for providing an HDR image stored in the memory 240 is described below.

The processor 250 may be included in the processor 120 of FIG. 1.

The processor 250 may perform an operation for providing an HDR image. The processor 250 may include one or more processors.

The processor 250 may include an application processor, a graphic processing unit (GPU), a digital signal processor (DSP), and/or a display driver integrated circuit (IC) capable of performing an operation for providing an HDR image. If the display driver IC performs at least part of the operation of providing an HDR image, the application processor (e.g., the main processor 121 of FIG. 1) may notify the display driver IC that the image to be played is an HDR image by updating each frame of the HDR image or by interrupting the start and end points of the HDR image. For example, the display driver IC, along with the display 230, may be included in a single module or package.

An embodiment of providing an HDR image performed by the processor 250 is described in greater detail below with reference to FIGS. 3 to 11.

Although FIG. 2 illustrates an example in which the electronic device 101 includes the communication module 210, the camera 220, the display 230, the memory 240, and the processor 250, it is not limited thereto. For example, the electronic device 101 may not include at least one component included in the electronic device 101 of FIG. 2 or may further include at least additional component from those components illustrated in FIG. 1.

An electronic device is provided that includes a display and at least one processor functionally connected with the display. The at least one processor is configured to obtain an HDR image, and identify, within a screen, a first area, in which the HDR image is displayed, and a second area, in which an image is displayed. The at least one processor is also configured to white point-process the first area based on a first white point and white point-process the second area based on a second white point that is set for the display and different from the first white point. The at least one processor is further configured to display, on the display, a screen including the white point-processed first area and the white point-processed second area.

The first white point may be $D_{65}$, and the second white point may be set as a default for the display or may be set by a user.

The first white point may be different from the second white point. For example, the first white point and/or the second white point may be set to a corresponding white point pre-defined by the international commission on illumination (CIE).

The image may include at least one of an SDR image, a GUI, text, and a background image.

The at least one processor may be further configured to identify, in the first area, a third area, in which the image is displayed, and a fourth area, in which an object is displayed. The object includes at least one of text and a graphic obtained through editing while or after obtaining the image. The at least one processor may be further configured to white point-process the third area based on the first white point, and white point-process the fourth area based on the second white point.

The at least one processor may be further configured to obtain information for a position and size of a layer of the HDR image and information for a position and size of a layer of the image, which are used to blend the layer of the HDR image and the layer of the image. The at least one processor may be further configured to identify the first area and the second area in the screen, based on the information for the position and size of the layer of the HDR image and the information for the position and size of the layer of the image.

The at least one processor may be further configured to white point-process the first area based on the second white point, when displaying of the HDR image is terminated.

The at least one processor may be further configured to gradually change a white point of the first area, until the white point of the first area changes from the first white point to the second white point, when the displaying of the HDR image is terminated.

The electronic device may further comprise a communication module. The at least one processor may be further configured to obtain, through the communication module, information for a third white point that is set for a display of an external electronic device, from the external electronic device which is connected with the electronic device. The at least one processor may also be configured to white point-process the first area based on the first white point, white point-process the second area based on the third white point, and transmit, through the communication module, to the external electronic device, information for a screen including the white point-processed first area and the white point-processed second area.

An electronic device is provided that includes a display and at least one processor functionally connected with the display. The at least one processor is configured to obtain an HDR image, white point-process the HDR image based on a first white point of a designated light source, white point-process an image based on a second white point set for the display, blend the white point-processed HDR image and the white point-processed image, and display, through the display, the blended HDR image and image.

The first white point may be $D_{65}$, and the second white point may be set as a default for the display or may be set by a user.

The image may include at least one of an SDR image, a GUI, text, or a background image.

The at least one processor may be configured to alpha-blend the layer of the white point-processed image and the layer of the white point-processed HDR image based on a designated alpha value.

Figure 3:
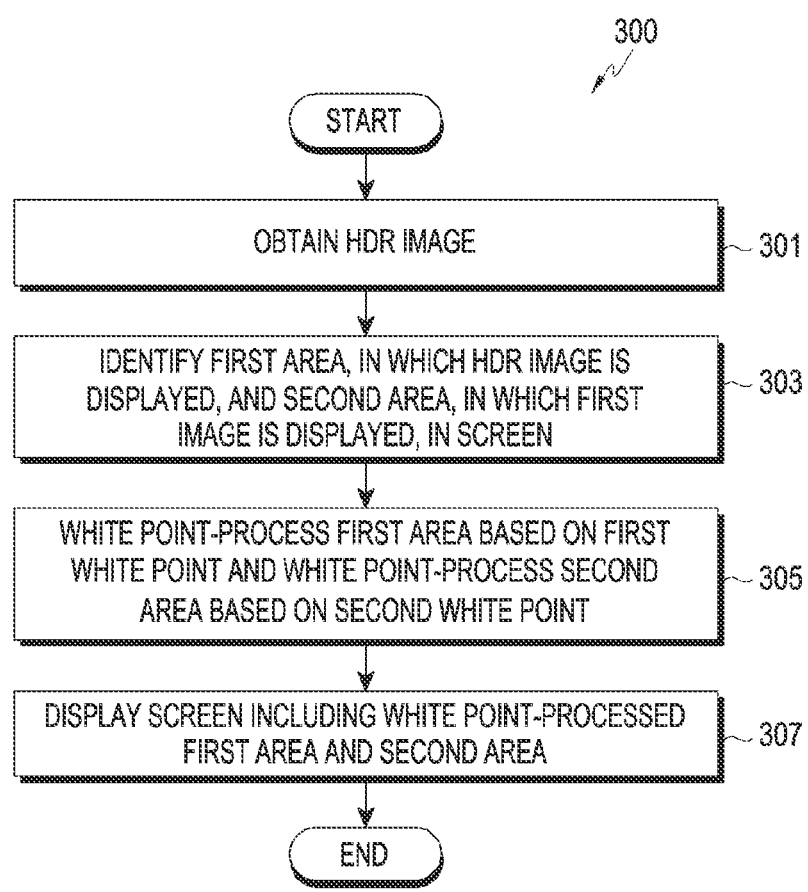
FIG. 3 is a flowchart illustrating a method for providing an HDR image, according to an embodiment.

FIG. 3 is a flowchart 300 illustrating a method for providing an HDR image, according to an embodiment.

Figure 4:
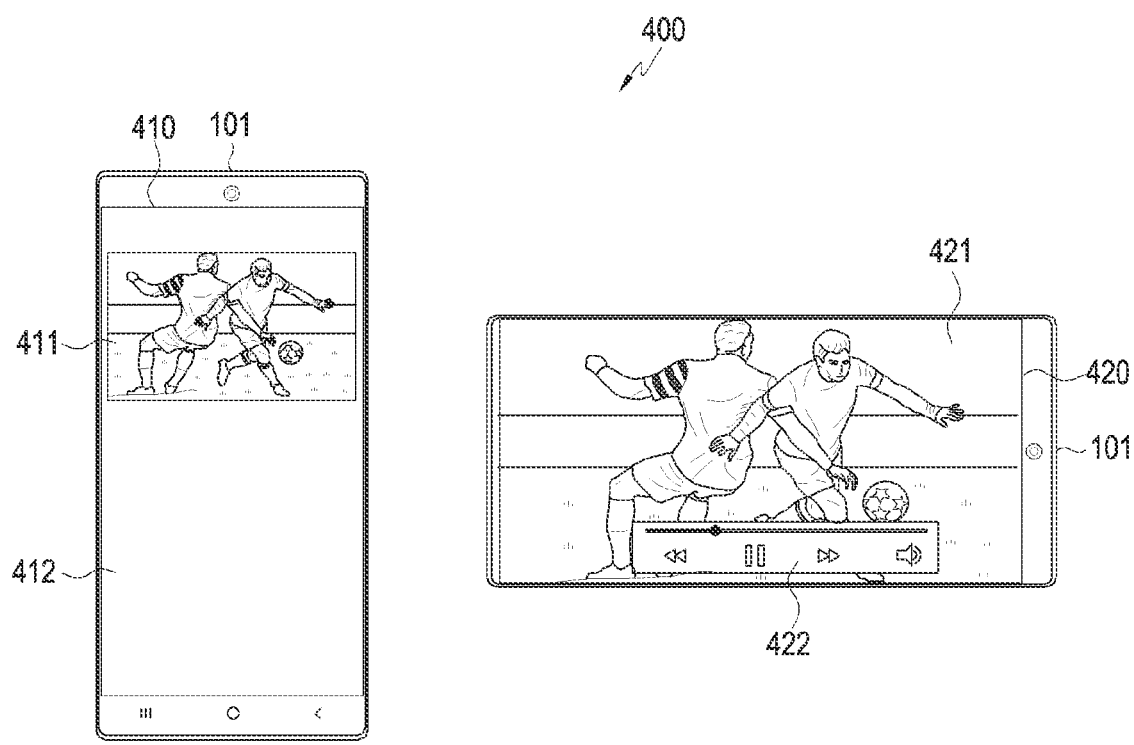
FIG. 4 is a diagram illustrating a method for identifying an HDR image and a first image, according to an embodiment.

FIG. 4 is a diagram 400 illustrating an example of a method for identifying an HDR image and a first image, according to an embodiment.

Referring to FIG. 3, at 301 of flowchart 300, the processor 250 obtains an HDR image.

The processor 250 may obtain an HDR image from an external electronic device through the communication module 210. For example, the processor 250 may receive, through the communication module 210, the HDR image from the external electronic device using a download scheme or a real-time streaming scheme. The processor 250 may obtain an HDR image through the camera 220. The processor 250 may obtain an HDR image from the memory 240.

The HDR image may include an HDR-applied dynamic image (video) or an HDR-applied still image.

If the HDR image is encoded, the processor 250 may perform decoding on the encoded HDR image using a scheme corresponding to the encoding scheme.

The processor 250 may perform HDR processing on the HDR image. For example, the processor 250 may perform tone mapping, color gamut conversion, and/or gamma correction for the HDR image based on metadata (e.g., dynamic metadata) of the HDR image. The metadata of the HDR image may include at least one of the color gamut, color depth (or bit depth), the gamma value (e.g., at least one of an optical-electronic transfer function (OETF) or an electronic-optical transfer function (EOTF)) or data for tone mapping. However, the information included in the metadata of the HDR image is not limited to the above-described examples. For example, the metadata of the HDR image may further include information specified in HDR-related standards (e.g., CTA-861, ST 2086, or ST 2094-40).

The processor 250 may perform tone mapping on the HDR image. For example, the processor 250 may perform tone mapping on the HDR image based on data for tone mapping included in the metadata of the HDR image.

The processor 250 may convert the color gamut of the HDR image. The processor 250 may convert the color gamut (e.g., a color gamut supported by the mastering display device 230) of the HDR image to a color gamut supported by the display 230 of the electronic device 101 based on the metadata of the HDR image. For example, in a case where the color gamut of the HDR image is a BT. 2020 color gamut (also referred to as a Rec. 2020 color gamut) color gamut, and the color gamut supported by the display 230 is a DCI-P3 color gamut (also referred to as a DCI/P3 color gamut), the processor 250 may convert the color gamut of the HDR image from the BT. 2020 color gamut to the DCI-P3 color gamut.

In an embodiment, the processor 250 may perform gamma correction on the HDR image. For example, the processor 250 may perform inverse transform of the OETF applied to the mastering operation of the HDR image using EOFT. The processor 250 may determine a transform function (e.g., perceptual quantization (PQ) gamma or hybrid log (HLG) gamma) based on metadata of the HDR image. The processor 250 may perform inverse transform on the HDR image according to the determined transform function.

The processor 250 may perform blending on the HDR image. For example, the processor 250 may blend the HDR image and the image which is displayed (or to be displayed), along with the HDR image, through the display 230 (hereinafter, referred to as a "first image"). For example, the processor 250 may blend the layer of the HDR image and the layer of the first image.

The first image may be a graphic user interface (GUI). For example, the first image may be an image including an object for controlling operations related to the play of the HDR image (e.g., an object for playing the HDR image, an object for terminating the play of the HDR image, an object for pausing the play of the HDR image, and/or a progress bar indicating the progress of the HDR image).

The first image may be an SDR image. When the first image is an SDR image, the processor 250 may perform color gamut conversion and/or gamma correction on the SDR image.

The first image may be text and/or a background image.

In the above-described example, although the first image is described as a GUI, an SDR image, text, and/or a background image, it is not limited thereto. For example, the first image may refer to an image (non HDR image), to which HDR is not applied, and which is displayed together with the HDR image.

The first image may be an image to be displayed through the display 230 together with the HDR image. However, embodiments of the disclosure are not limited thereto. For example, the first image may be an image that is displayed before the HDR image is displayed and may be displayed together with the HDR image while the HDR image is displayed. As another example, the first image may be an image that is displayed together with the HDR image after the HDR image is first displayed.

Referring back to FIG. 3, at 303, the processor 250 identifies a first area in which the HDR image is displayed in the screen, and a second area in which the first image is displayed.

The processor 250 may identify the first area (e.g., the position and size of the first area in which the HDR image is displayed in the screen) and the second area (e.g., the position and size of the second area in which the first image is displayed in the screen), in the blended screen of the HDR image and the first image.

For example, referring to FIG. 4, in a screen 410, the processor 250 may identify the first area 411 including the HDR image and the second area 412 including the first image (e.g., the background image). In the screen 410, the second area 412 including the first image may be an area that does not overlap the first area 411 including the HDR image. For example, as illustrated in the screen 410, in a case where the layer of the HDR image, which is smaller in size than the layer of the first image, is disposed on the layer of the first image so that the layer of the first image and the layer of the HDR image are blended, the second area 412 including the first image may be an area except for the area of the layer of the HDR image in the area of the layer of the first image. As another example, in a screen 420 of FIG. 4, the processor 250 may identify the first area 421 including the HDR image and the second area 422 including the first image (e.g., a GUI). In the screen 420, the first area 421 including the HDR image may be an area that does not overlap the second area 422 including the first image. For example, as illustrated in the screen 420, in a case where the layer of the first image, which is smaller in size than the layer of the HDR image, is disposed on the layer of the HDR image so that the layer of the first image and the layer of the HDR image are blended, the first area 421 including the HDR image may be an area except for the area 422 of the layer of the first image in the area of the layer of the HDR image. Although FIG. 4 illustrates an example in which one of the layer of the HDR image and the layer of the first image fully overlaps the other layer, the layer of the HDR image and the layer of the first image may partially overlap each other. In a case where the layer of the HDR image and the layer of the first image are blended in such a manner that the layer of the HDR image and the layer of the first image partially overlap, and the layer of the HDR image is disposed on the layer of the first image, the first area in which the HDR image is displayed may be the same as the layer of the HDR image, and the second area in which the first image is displayed may be an area except for the area, in which the area of the layer of the HDR image and the area of the layer of the first image overlap, of the area of the layer of the first image.

The processor 250 may identify the first area, in which the HDR image is displayed, and the second area, in which the first image is displayed, in the screen (e.g., the blended screen of the HDR image and the first image), based on information for the first area, in which the HDR image is displayed, and information for the second area, in which the first image is displayed, used for blending the HDR image and the first image.

The processor 250 may identify the first area, in which the HDR image is displayed, and the second area, in which the first image is displayed, in the screen by analyzing the screen including the first area and the second area. For example, the processor 250 may identify the first area and the second area in the screen by obtaining (e.g., extracting) the movement (e.g., a motion vector) of the image in the screen. However, the method of identifying the first area and the second area in the screen by analyzing the screen is not limited to a method for identifying the first area and the second area by obtaining the movement of the image in the screen.

Referring back to FIG. 3, at 305, the processor 250 white point-processes the first area based on a first white point and white point-processes the second area based on a second white point set for the display 230.

The processor 250 may white point-process the first area, in which the HDR image is displayed, based on $D_{65}$ as the first white point. For example, the processor 250 may white point-process the first area, in which the HDR image is displayed, based on $D_{65}$ defined by the CIE, as the first white point.

The processor 250 may white point-process the second area, in which the first image is displayed, based on the default white point of the display, as the second white point.

The processor 250 may white point-process the second area, in which the first image is displayed, based on the user-set white point, as the second white point. For example, if the white point set for the display 230 is changed from the default white point to the user set white point based on a user input, the processor 250 may white point-process the second area, which has been white point-processed based on the default white point, based on the user set white point.

The operation in which the processor 250 white point-processes an area based on a specific white point may denote an operation in which the processor 250 changes (or maintains) the color coordinates on the chromaticity diagram with respect to the specific white point. For example, the operation in which the processor 250 white point-processes the second area, which has been white point-processed based on the default white point, based on the user-set white point may denote an operation in which the processor 250 changes the color coordinates of the pixels of the second area from the color coordinates based on the default white point to the color coordinates based on the user set white point.

In the above-described examples, the processor 250 white point-processes the first area based on the first white point and white point-processes the second area based on the second white point, but embodiments of the disclosure are not limited thereto. For example, the processor 250 may white point-process both the first area and the second area based on the second white point (e.g., the default white point or the user-set white point).

Referring again to FIG. 3, at 307, the processor 250 displays, through the display 230, a screen including the first area white point-processed based on the first white point and the second area white point-processed based on the second white point. For example, the processor 250 may display, using the display 230, the HDR image through the first area white point-processed based on the first white point and the first image through the second area white point-processed based on the second white point.

The processor 250 may display, through the display 230, a screen including the first area white point-processed based on the first white point and the second area white point-processed based on the second white point, using various schemes. For example, the processor 250 may display, through the display 230, a screen including the first area white point-processed based on the first white point and the second area white point-processed based on the second white point, using a pop-up window scheme and/or a multi-window scheme (e.g., a plurality of windows displayed on one screen). However, without being limited thereto, the processor 250 may display, through the display 230, a screen including the first area white point-processed based on the first white point and the second area white point-processed based on the second white point, in one window.

In a case where the display of the HDR image is terminated while displaying the screen including the first image and the HDR image, the processor 250 may display, through the display 230, the first image white point-processed based on the second white point.

Although FIG. 4 illustrates an example screen including two areas, embodiments of the disclosure are not limited thereto. For example, the screen may include three or more areas, and the above-described examples may also be applied even where the screen includes three or more areas, in the same or a similar manner.

The processor 250 may prevent irregularities for the screen by white point-processing the HDR image and the non-HDR image based on different white points.

The processor 250 may minimize irregularities for the screen displayed before/after termination of the play of the HDR image by white point-processing the first area, which is white point-processed based on the first white point and where the HDR image used to be displayed, based on the second white point.

Figure 5:
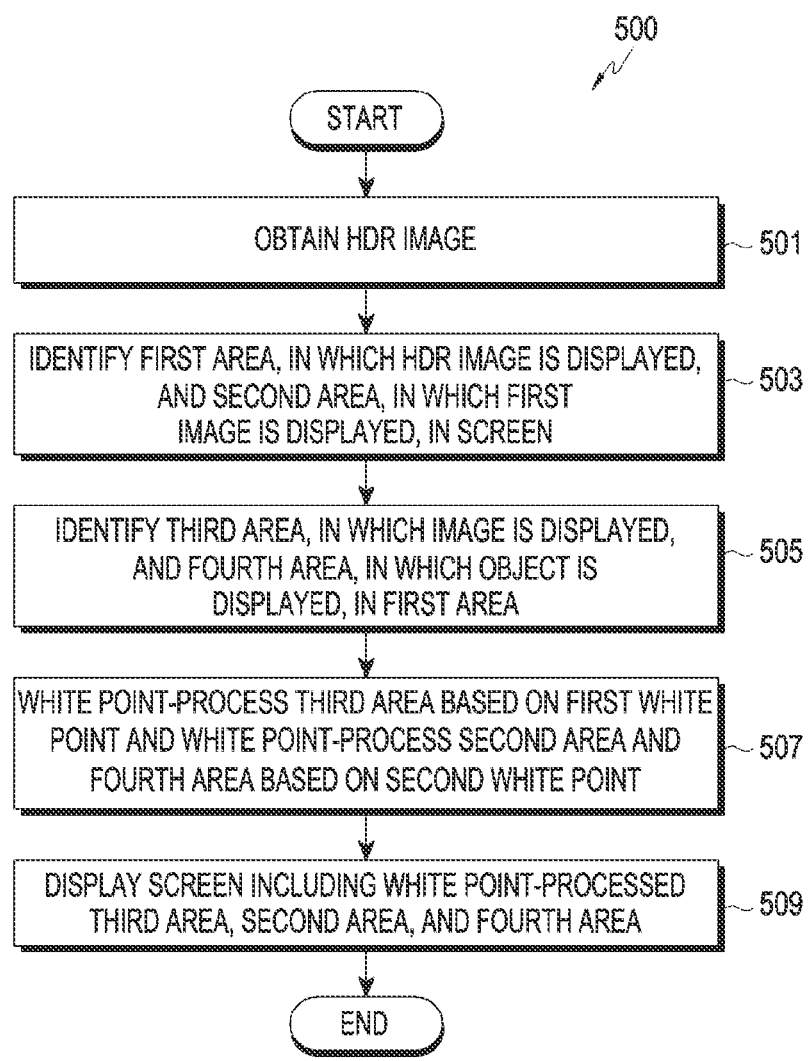
FIG. 5 is a flowchart illustrating a method for providing an HDR image, according to an embodiment.

FIG. 5 is a flowchart 500 illustrating a method for providing an HDR image, according to an embodiment.

Figure 6:
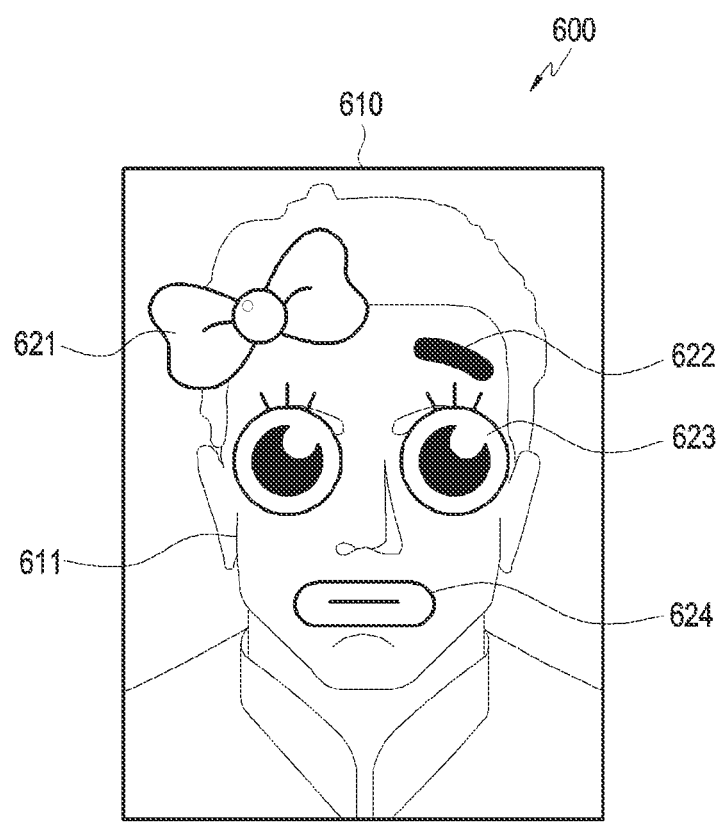
FIG. 6 is a diagram illustrating a method for providing an HDR image, according to an embodiment.

FIG. 6 is a diagram 600 illustrating an example of a method for providing an HDR image, according to an embodiment.

Referring to FIGS. 5 and 6, at 501 of flowchart 500, the processor 250 obtains an HDR image, which is at least partially the same or similar to 301 of FIG. 3. Accordingly, a detailed description of 501 is omitted At 503, the processor 250 identifies a first area in which the HDR image is displayed and a second area in which the first image is displayed, in the screen, which is at least partially the same or similar to 303 of FIG. 3. Accordingly, a detailed description of 503 is omitted.

At 505, the processor 250 identifies a third area in which an image is displayed in the first area (e.g., the portion corresponding to the image is displayed in the HDR image) and a fourth area in which an object is displayed.

The HDR image displayed in the first area may include an image portion and an object including at least one of text or graphic obtained through editing while or after obtaining the image. For example, as shown in FIG. 6, an HDR image 610 includes a portion 611 having the image obtained through the camera 220, and objects 621, 622, 623, and 624. The object included in the HDR image may be obtained together with the image portion while obtaining the image portion, or may be obtained after obtaining the image portion. For example, the objects 621, 622, 623, and 624 included in the HDR image may be obtained by editing (e.g., overlaying the object on the obtained image portion) at least a portion of the obtained image portion 611, using an image edit application, while obtaining the image portion through the camera 220. As another example, the objects 621, 622, 623, and 624 included in the HDR image may be obtained by editing at least a portion of the obtained image portion using an image edit application after obtaining the image portion through the camera 220. However, methods for obtaining the objects 621, 622, 623, and 624 included in the HDR image are not limited to those described above.

The processor 250 may identify the third area in which the image is displayed and the fourth area in which the object is displayed in the first area by analyzing the first area (e.g., the HDR image). For example, the processor 250 may obtain (e.g., extract) the movement (e.g., motion vector) of the image for the first area and determine that an area, in which the movement of the image in the first area is a designated movement or more, is the third area. The processor 250 may determine that an area, in which the movement of the image is less than the designated movement, is the fourth area. As another example, the processor 250 may determine that an area including only gray-based colors (e.g., white and black) in the first area is the fourth area, and determine that an area except for the fourth area in the first area is the third area. However, methods in which the processor 250 identifies the third area in which the image is displayed and the fourth area in which the object (e.g., an object including at least one of text or graphic obtained through editing while or after obtaining the image) is displayed in the first area are not limited to the above-described examples. For example, the processor 250 may obtain the object along with the image portion, by editing the image portion, while or after obtaining the image portion included in the HDR image. The processor 250 may identify the third area in which the image portion is displayed and the fourth area in which the object is displayed, in the HDR image, based on information for the object (e.g., information for the position and/or size of the object).

Referring back to FIG. 5, at 507, the processor 250 white point-processes the third area based on the first white point, and white point-processes the second area and the fourth area based on the second white point set for the display 230. For example, the processor 250 may white point-process the third area, in which the image portion is displayed in the HDR image, based on the first white point, and may white point-process the second area, in which the first image is displayed, and the fourth area, in which the object is displayed in the HDR image, based on the second white point set for the display 230.

At 507, the operation in which the processor 250 white point-processes the third area based on the first white point and white point-processes the second area and the fourth area based on the second white point is at least partially identical or similar to the operation of white point-processing the first area based on the first white point and white point-processing the second area based on the second white point in 305 of FIG. 3. Accordingly, a detailed description is omitted.

At 509, the processor 250 displays, through the display 230, a screen including the third area white point-processed based on the first white point and the second and fourth areas white point-processed based on the second white point. For example, the processor 250 may display, using the display 230, the image portion of the HDR image through the third area white point-processed based on the first white point, the first image through the second area white point-processed based on the second white point, and the object of the HDR image through the fourth area white point-processed based on the second white point.

Although FIG. 5 illustrates an example of identifying the third area, in which the image is displayed, and the fourth area, in which the object is displayed, in the first area through analysis on the first area at 503, embodiments of the disclosure are not limited thereto. For example, the processor 250 may identify the image portion and the object in the HDR image by analyzing the HDR image before blending the HDR image and the first image. The processor 250 may obtain information for the area of the image portion in the area of the HDR image (e.g., information for the position and size of the image portion) and information for the area of the object (e.g., information for the position and size of the object). After the HDR image and the first image are blended, the processor 250 may identify the third area, in which the image portion is displayed, and the fourth area, in which the object is displayed, in the first area, in which the HDR image is displayed, based on the information for the area of the image portion in the area of the HDR image and the information for the area of the object.

If the HDR image includes the image and the object, the processor 250 may white point-process the image based on the first white point and white point-process the object based on the second white point, thereby minimizing oddness for the screen displayed before/after the play of the HDR image is terminated.

Figure 7:
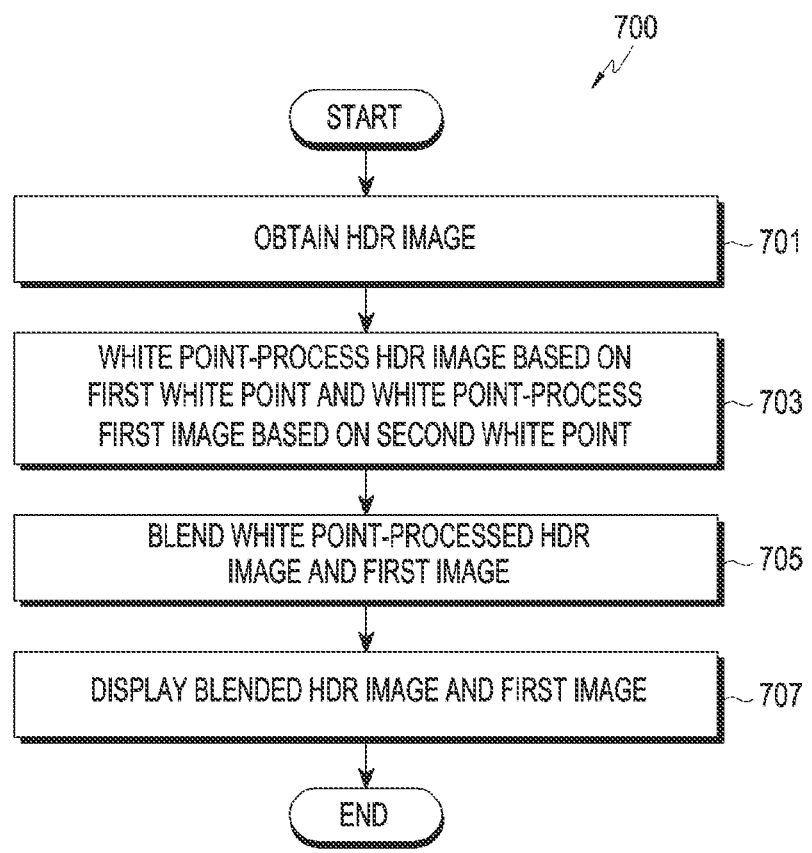
FIG. 7 is a flowchart illustrating a method for providing an HDR image, according to an embodiment.

FIG. 7 is a flowchart 700 illustrating a method for providing an HDR image, according to an embodiment.

Referring to FIG. 7, at 701 of flowchart 700, the processor 250 obtains an HDR image. For example, the processor 250 may obtain an HDR image from an external electronic device through the communication module 210. As another example, the processor 250 may obtain an HDR image through the camera 220. As another example, the processor 250 may obtain an HDR image from the memory 240.

At 703, the processor 250 white point-processes the HDR image based on a first white point (e.g., $D_{65}$), and white point-processes the first image based on a second white point (e.g., the default white point of the display 230 or the user set white point) set for the display 230.

If the HDR image is encoded, the processor 250 may perform decoding on the encoded HDR image using a scheme corresponding to the encoding scheme.

The processor 250 may perform HDR processing on the HDR image.

The processor 250 may perform tone mapping on the HDR image.

The processor 250 may perform gamma correction on the HDR image.

The processor 250 may convert the color gamut of the HDR image. For example, the processor 250 may convert the color gamut of the HDR image to a color gamut supported by the display 230 of the electronic device 101 based on the metadata of the HDR image. The processor 250 may perform the operation of converting the color gamut of the HDR image and then white point-processing the HDR image.

The processor 250 may perform a color gamut conversion operation including the operation of white point-processing the HDR image. For example, the processor 250 may process the white point based on the first white point while simultaneously converting the color gamut, for the HDR image.

The processor 250 may perform processing on the first image. For example, the processor 250 performs processing on the first image in the same or similar manner to HDR processing and white point processing on the HDR image.

At 705 of FIG. 7, the processor 250 may blend the HDR image white point-processed based on the first white point and the first image white point-processed based on the second white point. For example, the processor 250 may alpha-blend the layer of the HDR image white point-processed based on the first white point (and the layer of the first image white point-processed based on the second white point.

In a case where the layer of the HDR image is disposed on the layer of the first image so that the layer of the first image and the layer of the HDR image are blended (e.g., alpha-blended), the processor 250 may blend the layer of the first image and the layer of the HDR image so that the HDR image is displayed in the area in which the area of the layer of the first image and the area of the layer of the HDR image overlap each other (e.g., the processor 250 sets the alpha value for the layer of the HDR image to 1 and the alpha value for the layer of the first image to 0 and then blends the layer of the first image and the layer of the HDR image).

In a case where the layer of the first image is disposed on the layer of the HDR image so that the layer of the first image and the layer of the HDR image are blended, the processor 250 may blend the layer of the first image and the layer of the HDR image so that the first image is displayed in the area in which the area of the layer of the first image and the area of the layer of the HDR image overlap each other.

In a case where there is an area, in which the area of the layer of the HDR image and the area of the layer of the first image overlap each other, in the screen, the processor 250 may blend the layer of the first image and the layer of the HDR image so that the first image or the HDR image is displayed in the area in which the area of the layer of the first image and the area of the layer of the HDR image overlap each other. For example, in a case where the HDR image is displayed through a pop-up window in the area in which the first image is displayed, the processor 250 may blend the layer of the first image and the layer of the HDR image so that the HDR image is displayed in the area in which the first image is displayed. For example, the processor 250 may set the alpha value for the layer of the HDR image to 1 and the alpha value for the layer of the first image to 0, and then may blend the layer of the first image and the layer of the HDR image.

In a case where there is no overlapping area between the area of the layer of the HDR image and the area of the layer of the first image in the screen, the processor 250 may blend the layer of the first image and the layer of the HDR image using a designated alpha value (or any alpha value). For example, in a case where the first image and the HDR image are displayed through layers which do not overlap (without an overlapping area) through multiple windows, the processor 250 may blend the layer of the first image and the layer of the HDR image using a designated alpha value (or any alpha value).

Referring back to FIG. 7, at 707, the processor 250 displays the blended first image and HDR image through the display 230.

Figure 8:
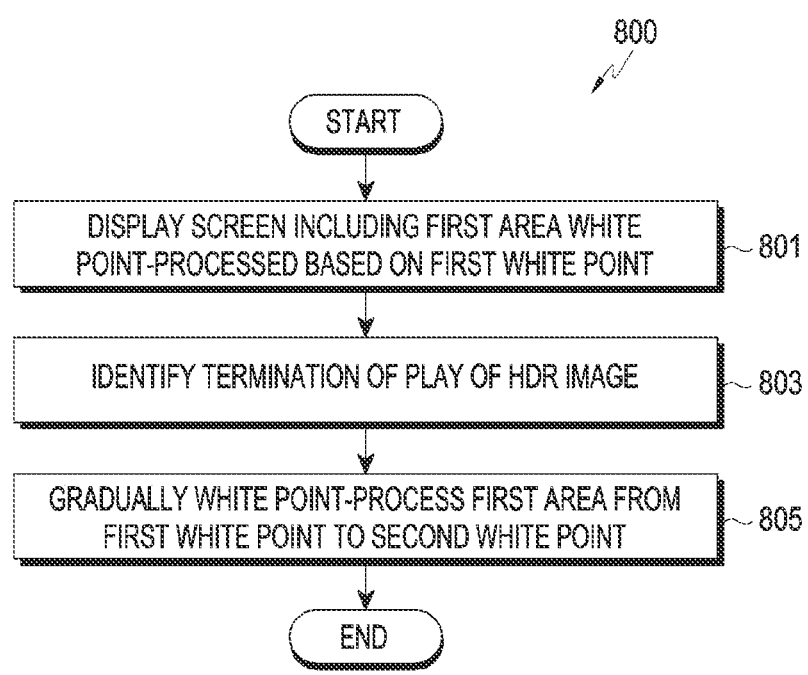
FIG. 8 is a flowchart illustrating a method for processing a white point for a screen after the display of an HDR image is terminated, according to an embodiment.

FIG. 8 is a flowchart 800 illustrating a method for processing a white point for a screen after the play of an HDR image is terminated, according to an embodiment.

Figure 9:
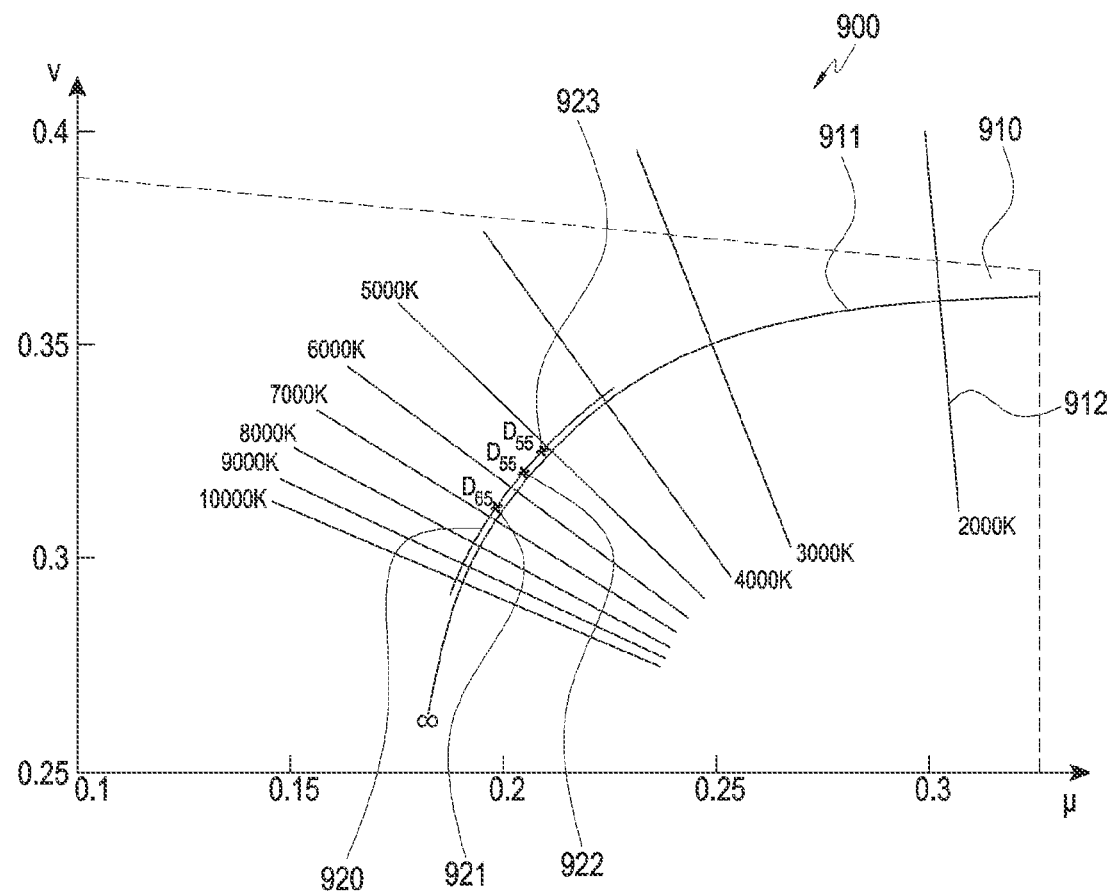
FIG. 9 is a diagram illustrating a method for processing a white point for a screen after the display of an HDR image is terminated, according to an embodiment.

FIG. 9 is a diagram 900 illustrating an example of a method for processing a white point for a screen after the play of an HDR image is terminated, according to an embodiment.

Referring to FIGS. 8 and 9, at 801 of flowchart 800, the processor 250 displays, through the display 230, a screen including a first area white point-processed based on a first white point. For example, the processor 250 may display, through the display 230, a screen including the first area white point-processed based on $D_{65}$, as the first white point and displaying the HDR image. As another example, the processor 250 may display, through the display 230, a screen including a first area white point-processed based on the first white point and displaying the HDR image and a second area displaying a first image (e.g., a GUI, SDR image, text, and/or background image) white point-processed based on a second white point (e.g., the default white point of the display or the user set white point).

At 803, the processor 250 identifies that the play of the HDR image is terminated.

The processor 250 may identify the termination of the play of the HDR image displayed through the first area of the screen. For example, the processor 250 may identify that the window, in which the HDR image used to be displayed, is not displayed as the display of the HDR image is terminated (e.g., based on a user input after the last frame of the HDR image is played).

At 805, the processor 250 gradually white point-processes the first area, in which the HDR image used to be displayed, from the first white point to the second white point. For example, the processor 250 may change the white point of the first area so that the white point of the first area is changed to the second white point by changing the white point of the first area, in which the HDR image used to be displayed, by a designated white point interval every designated time interval from the first white point.

A diagram 900 of FIG. 9 shows a part of the UV coordinate system (CIE 1960 UCS diagram). Reference number 910 denotes part of the color gamut, reference number 911 denotes the black body locus, and the vertical lines of the black body locus corresponding to color temperatures 2000K to 1000K (e.g., a line 912 corresponding to a color temperature of 2000K) denote isotherms. Reference numeral 921 denotes $D_{65}$, reference numeral 922 denotes $D_{55}$, and reference numeral 923 denotes $D_{50}$. A line 920 including $D_{65}$, $D_{55}$, and $D_{50}$ may be a line substantially parallel to the black body locus. The line 920 may be a line within a range (e.g., larger than or equal to −0.005 and less than or equal to +0.005) of a designated delta UV (or delta U'V') from the black body locus 911.

The processor 250 may change the coordinates of the white point of the first area, by a designated coordinate interval on the line 920, every designated time interval, until the white point of the first area, in which the HDR image used to be displayed, becomes the second white point. For example, in a case where the first white point is $D_{65}$, and the second white point is $D_{50}$, the processor 250 may change the coordinates of the white point of the first area, along the line 920, by a designated coordinate interval, every designated time interval, until the white point of the first area reaches $D_{50}$ from $D_{65}$.

The processor 250 may display, through the display 230, the gradually white point-processed first area while gradually white point-processing the first area, in which the HDR image used to be displayed, from the first white point to the second white point. For example, the processor 250 may white point-process the first area, every designated time interval, based on the white point changed by the designated coordinate interval while changing the coordinates of the white point of the first area, by the designated coordinate interval, every designated time interval, until the white point of the first area, in which the HDR image used to be displayed, to the second white point. The processor 250 may display, through the display 230, the first area white point-processed based on the white point changed by the designated coordinate interval, every designated time interval.

In a case where the first area is white point-processed based on the second white point, the processor 250 may display, through the display 230, a screen including the first area and second area white point-processed based on the second white point.

The processor 250 gradually white point-processes the first area, in which the HDR image used to be displayed, from the first white point to the second white point after the play of the HDR image is terminated, thereby minimizing irregularities for the screen displayed before/after the termination of the play of the HDR image, which used to be displayed through the first area white point-processed based on the first white point.

Although FIGS. 8 and 9 illustrate an example in which the processor gradually white point-processes the first area, in which the HDR image used to be displayed, from the first white point to the second white point after the play of the HDR image is terminated, embodiments of the disclosure are not limited thereto. For example, the processor may white point-process the first area which was white point-processed based on the first white point and in which the HDR image was displayed, based on the second white point immediately after the play of the HDR image is terminated.

Figure 10:
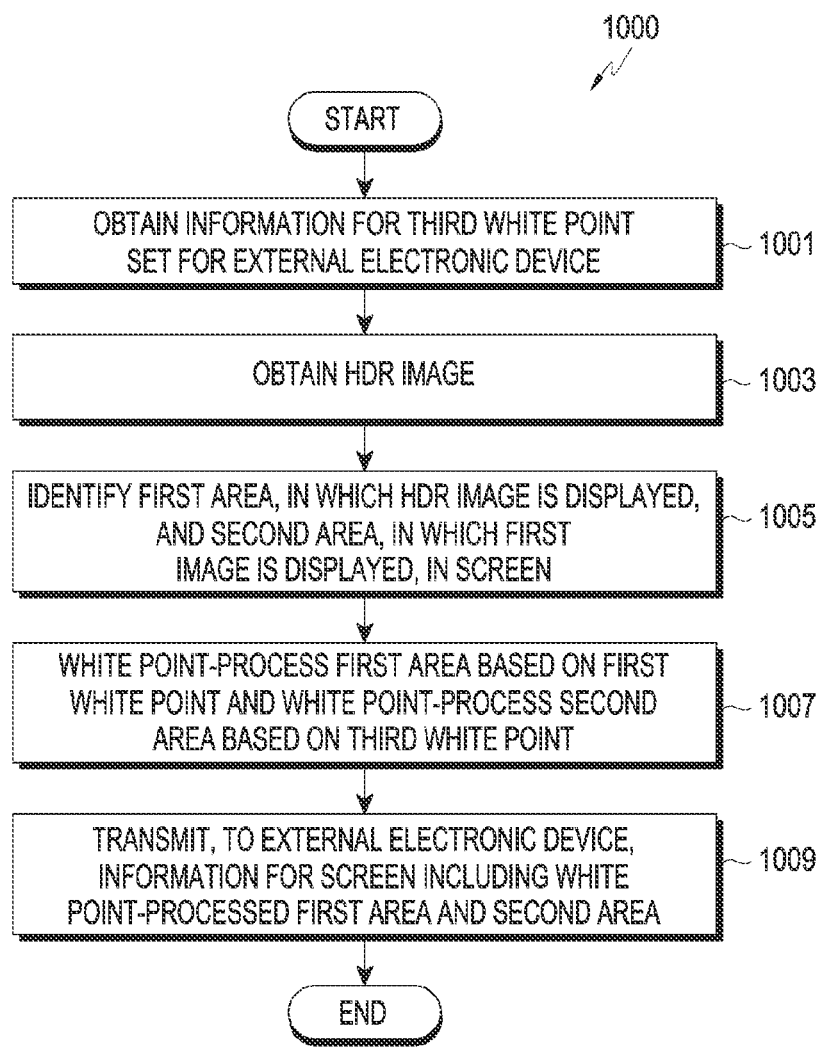
FIG. 10 is a flowchart illustrating a method for processing a white point for an HDR image when an electronic device shares the HDR image with an external electronic device, according to an embodiment.

FIG. 10 is a flowchart (1000) illustrating a method for processing a white point for an HDR image when an electronic device shares the HDR image with an external electronic device, according to an embodiment.

At 1001 of flowchart 1000, the processor 250 obtains information for a third white point set for an external electronic device from the external electronic device through the communication module 210.

The processor 250 may communicatively connect the electronic device 101 and the external electronic device through the communication module 210 to share the screen including the HDR image. For example, the processor 250 may communicatively connect the electronic device 101 and the external electronic device through the communication module 210 (e.g., a Wi-Fi module) using screen sharing technology (e.g., mirroring or miracast) to display the screen including the HDR image, which used to be displayed through the display 230 of the electronic device 101, on the external electronic device (e.g., a TV).

After the electronic device 101 and the external electronic device are communicatively connected, the processor 250 may obtain information for the third white point set for the external electronic device from the external electronic device. For example, after the electronic device 101 and the external electronic device are communicatively connected, the processor 250 may obtain, from the external electronic device, information for the default white point of the display of the external electronic device or the user set white point of the external electronic device.

At 1003, the processor 250 obtains an HDR image, which is at least partially the same or similar to 301 of FIG. 3. Accordingly, a detailed description of 1003 is omitted.

In FIG. 10, 1001 is shown as being performed prior to 1003, but embodiments are not limited thereto. For example, 1001 may be performed after 1003.

At 1005, the processor 250 identifies a first area in which the HDR image is displayed and a second area in which the first image is displayed, in the screen.

At 1007, the processor 250 white point-processes the first area based on the first white point, and white point-processes the second area based on the third white point set for the display of the external electronic device.

In FIGS. 10, 1005 and 1007 are at least partially identical or similar to 303 and 305 of FIG. 3. Accordingly, a detailed description of 1005 and 1007 is omitted.

At 1009, the processor 250 transmits, through the communication module 210, information for the screen including the first area white point-processed based on the first white point and the second area white point-processed based on the third white point. The processor 250 may encode the screen including the first area white point-processed based on the first white point and the second area white point-processed based on the third white point, and may transmit the encoded screen through the communication module 210 to the external electronic device.

The external electronic device may display, through the display, the screen including the first area white point-processed based on the first white point and the second area white point-processed based on the third white point, based on the received information for the screen, including the first area white point-processed based on the first white point and the second area white point-processed based on the third white point.

The processor 250 may allow the screen to be shared between the electronic device 101 and the external electronic device using different schemes depending on transmission schemes for sharing the screen between the electronic device 101 and the external electronic device.

For example, if the transmission scheme for sharing the screen between the electronic device 101 and the external electronic device is a direct stream scheme, the processor 250 may transmit the HDR image (and the first image) through the communication module 210 to the external electronic device without performing the operation of processing the HDR image (and the first image). The external electronic device may display the received screen including the HDR image by white point-processing the received HDR image (and first image) based on the white point set for the display of the external electronic device, or by white point-processing the received HDR image (and first image) using the scheme described above in connection with FIGS. 2 to 9.

As another example, if the transmission scheme for sharing the screen between the electronic device 101 and the external electronic device is not a direct stream scheme, as described above in connection with the examples of FIG. 10, the processor 250 may receive, from the external electronic device, information for the third white point through the communication module 210, and may transmit, to the external electronic device, through the communication module 210, information for the screen including the first area white point-processed based on the first white point and the second area white point-processed based on the received third white point.

When the electronic device 101 shares the screen with the external electronic device, the processor 250 may perform a white point-processing operation on the screen based on the white point of the display of the external electronic device, thereby minimizing oddness for the screen displayed before/after the play of the HDR image on the external electronic device is terminated.

Figure 11:
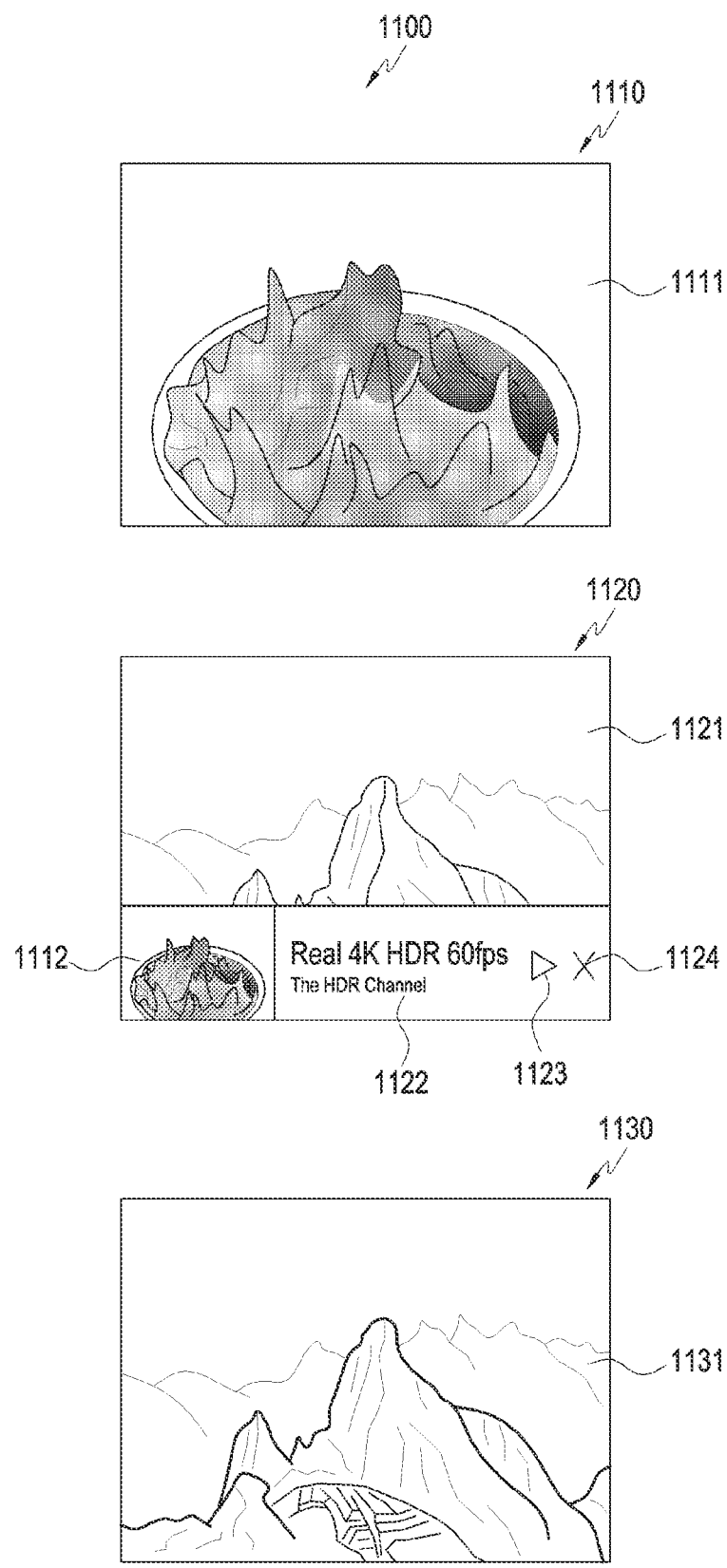
FIG. 11 is a diagram illustrating a method for providing an HDR image, according to an embodiment.

FIG. 11 are diagrams illustrating an example of a method for providing an HDR image, according to an embodiment.

Referring to diagrams 1100 of FIG. 11, the processor 250 displays a screen 1111 including an HDR image, as a full screen, through the display 230, as illustrated in reference numeral 1110. The screen 1111 including the HDR image may be a screen white point-processed based on the first white point.

The processor 250 may display, through the display 230, the screen including the HDR image 1111, which is being displayed as the full screen, in a shrunken area, based on a user input. For example, as illustrated in reference numeral 1120, the processor 250 displays a shrunken screen in a first area 1112 by shrinking the screen 1111 including the HDR image being displayed as the full screen, through the display 230. The processor 250 displays, through the display 230, an SDR image displayed in a second area 1121 and a GUI (e.g., an object 1123 and an object 1124) displayed in a third area 1122, along with the shrunken screen displayed in the first area 1112. The first area 1112 may be a screen white point-processed based on the first white point, and the second area 1121 and the third area 1122 may be areas white point-processed based on the second white point.

The processor 250 may identify that the play of the HDR image is terminated. For example, the processor 250 may terminate the play of the HDR image based on a user input to the object 1124 for terminating the HDR image. Upon identifying the termination of the play of the HDR image, the processor 250 displays, through the display 230, a screen 1131 including an SDR image through the full screen, as illustrated in reference number 1130. For example, the processor 250 may display, through the display 230, the screen 1131 including the SDR image white point-processed based on the second white point.

A method is provided for providing an HDR image by an electronic device. The HDR image is obtained. A first area, in which the HDR image is displayed, and a second area, in which an image is displayed, are identified within a screen. The first area is white point-processed based on a first white point, and the second are is white point-processed based on a second white point that is set for a display of the electronic device and different from the first white point. The screen including the white point-processed first area and the white point-processed second area is displayed on the display.

The first white point may be $D_{65}$, and the second white point may be set as a default for the display or may be set by a user.

The image may include at least one of an SDR image, a GUI, text, and a background image.

The method may further include identifying, in the first area, a third area, in which the image is displayed, and a fourth area, in which an object is displayed. The object includes at least one of text and a graphic obtained through editing while or after obtaining the image. The method may also include white point-processing the third area based on the first white point, and white point-processing the fourth area based on the second white point.

Identifying the first area, in which the HDR image is displayed, and the second area, in which the image is displayed, in the screen may include obtaining information for a position and size of a layer of the HDR image and information for a position and size of a layer of the image, which are used to blend the layer of the HDR image and the layer of the image, and identifying the first area and the second area in the screen, based on the information for the position and size of the layer of the HDR image and the information for the position and size of the layer of the image.

The method may further include white point-processing the first area based on the second white point, when displaying of the HDR image is terminated.

White point-processing the first area based on the second white point, when the displaying of the HDR image is terminated may include gradually changing a white point of the first area, until the white point of the first area changes from the first white point to the second white point, when the displaying of the HDR image is terminated.

The method may further include obtaining, through a communication module of the electronic device, information for a third white point set for a display of an external electronic device, from the external electronic device connected with the electronic device. The method may also include white point-processing the first area based on the first white point, white point-processing the second area based on the third white point, and transmitting, through the communication module, to the external electronic device, information for a screen including the white point-processed first area and the white point-processed second area.

Further, the structure of the data used herein may be recorded in a computer-readable recording medium via various means. The computer-readable recording medium includes a storage medium, such as a magnetic storage medium (e.g., a read only memory (ROM), a floppy disc, or a hard disc) or an optical reading medium (e.g., a compact disc (CD)-ROM or a digital versatile disc (DVD)).

A computer-readable recording medium recording computer-executable programs may record a program to execute, in an electronic device, the operations of obtaining the HDR image, identifying, within a screen, a first area in which the HDR image is displayed, and a second area in which an image is displayed, white point-processing the first area based on a first white point, white point-processing the second area based on a second white point that is set for a display of the electronic device and different from the first white point, and displaying, on the display, the screen including the white point-processed first area and the white-point processed second area.

When the disclosure has been shown and described with reference to certain embodiments thereof, it will be understood by those skilled in the art that various changes in form and detail may be made therein without departing from the scope of the disclosure. Therefore, the scope of the disclosure should not be defined as being limited to the embodiments, but should be defined by the appended claims and their equivalents.

What is claimed is:

1. An electronic device comprising:
    a display; and
    at least one processor including processing circuitry; and
        memory storing instructions that, when executed by the at least one processor individually or collectively, cause the electronic device to:
        obtain a high dynamic range (HDR) image;
        identify, within a screen, a first area, in which the HDR image is displayed, and a second area, in which a standard dynamic range (SDR) image is displayed;
        white point-process the first area based on a first white point set for an HDR image, and white point-process the second area based on a second white point that is currently set for the display, wherein a color temperature of the second white point is different from a color temperature of the first white point;
        display, on the display, the screen including the white point-processed first area and the white point-processed second area, and
        based on displaying of the HDR image being terminated based on a user input, white point-process a white point of the first area in which the HDR image is not displayed that is gradually changed from the first white point to the second white point.

2. The electronic device of claim 1, wherein:
    the first white point is $D_{65}$; and
    the second white point is set as a default for the display or is set by a user.

3. The electronic device of claim 1, wherein the instructions, when executed by the at least one processor individually or collectively, further cause the electronic device to:
    identify, in the first area, a third area, in which an image portion included in the HDR image is displayed, and a fourth area, in which an object included in the HDR image is displayed, wherein the object comprises at least one of text and a graphic obtained through editing while or after obtaining the image; and
    white point-process the third area based on the first white point, and white point-process the fourth area based on the second white point.

4. The electronic device of claim 1, wherein the instructions, when executed by the at least one processor individually or collectively, further cause the electronic device to:
    obtain information for a position and size of a layer of the HDR image and information for a position and size of a layer of the SDR image, which are used to blend the layer of the HDR image and the layer of the SDR image; and
    identify the first area and the second area in the screen, based on the information for the position and size of the layer of the HDR image and the information for the position and size of the layer of the image.

5. The electronic device of claim 1, further comprising:
    a communication module,
    wherein the instructions, when executed by the at least one processor individually or collectively, further cause the electronic device to:
        obtain, through the communication module, information for a third white point that is set for a display of an external electronic device, from the external electronic device, which is connected with the electronic device;

white point-process the first area based on the first white point, and white point-process the second area based on the third white point; and transmit, through the communication module, to the external electronic device, information for a screen including the white point-processed first area and the white point-processed second area.

6. A method for providing an HDR image by an electronic device, the method comprising:

obtaining the HDR image;

identifying, within a screen, a first area, in which the HDR image is displayed, and a second area, in which an SDR image is displayed;

white point-processing the first area based on a first white point set for the HDR image, and white point-processing the second area based on a second white point that is set for a display of the electronic device, wherein a color temperature of the second white point is different from a color temperature of the first white point;

displaying, on the display, the screen including the white point-processed first area and the white point-processed second area; and based on displaying of the HDR image being terminated based on a user input, white point-processing a white point of the first area in which the HDR image is not displayed that is gradually changed from the first white point to the second white point.

7. The method of claim 6, wherein:

the first white point is $D_{65}$; and the second white point is set as a default for the display or is set by a user.

8. The method of claim 6, further comprising:

identifying, in the first area, a third area, in which an image portion included in the HDR image is displayed, and a fourth area, in which an object included in the HDR image is displayed, wherein the object comprises at least one of text and a graphic obtained through editing while or after obtaining the image; and white point-processing the third area based on the first white point, and white point-processing the fourth area based on the second white point.

9. The method of claim 6, wherein identifying the first area, in which the HDR image is displayed, and the second area, in which the image is displayed, comprises:

obtaining information for a position and size of a layer of the HDR image and information for a position and size of a layer of the SDR image, which are used to blend the layer of the HDR image and the layer of the SDR image; and identifying the first area and the second area in the screen, based on the information for the position and size of the layer of the HDR image and the information for the position and size of the layer of the image.

10. The method of claim 6, further comprising:

obtaining, through a communication module of the electronic device, information for a third white point set for a display of an external electronic device, from the external electronic device connected with the electronic device;

white point-processing the first area based on the first white point and white point-processing the second area based on the third white point; and transmitting, through the communication module, to the external electronic device, information for a screen including the white point-processed first area and the white point-processed second area.

* * * * *